(12) United States Patent
Villier et al.

(10) Patent No.: US 6,675,018 B2
(45) Date of Patent: Jan. 6, 2004

(54) METHOD OF AND SYSTEM FOR ESTIMATING A TIME OF ARRIVAL OF A RADIO SIGNAL

(75) Inventors: Eric Villier, Swindon (GB); Luis Lopes, Swindon (GB); Brendan Ludden, Swindon (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/468,998

(22) Filed: Dec. 21, 1999

(65) Prior Publication Data

US 2003/0036390 A1 Feb. 20, 2003

(30) Foreign Application Priority Data

Jan. 9, 1999 (GB) .............................. 9900340

(51) Int. Cl.[7] .............................................. H04Q 7/20
(52) U.S. Cl. ................. 455/456.1; 455/67.11; 455/67.16
(58) Field of Search .............................. 455/456.1, 457, 455/10, 25, 225, 67.11, 67.16; 342/457

(56) References Cited

U.S. PATENT DOCUMENTS 5,822,368 A * 10/1998 Wang ........................ 375/229
6,009,334 A * 12/1999 Grubeck et al. .......... 455/456.2
6,097,959 A *  8/2000 Yost et al. .................. 455/456
6,154,657 A * 11/2000 Grubeck et al. ............ 455/456
6,266,014 B1 *  7/2001 Fattouche et al. .......... 342/450
6,317,474 B1 * 11/2001 Carsello ..................... 375/354

FOREIGN PATENT DOCUMENTS

| GB | 2232318 A | 12/1990 | ................. 455/456 |
| GB | 2288701 A | 10/1995 | ................. 455/456 |

* cited by examiner

Primary Examiner—Lee Nguyen
Assistant Examiner—Tuan Tran
(74) Attorney, Agent, or Firm—Roland K. Bowler, II

(57) ABSTRACT

The invention relates to a method for estimating time of arrival of radio signals in particular as used for location determination. A known method of determining the location of a subscriber unit (401) calculates a number of ranges based on the distance from base stations (403,405,407) with known location. The ranges are calculated from time of arrival estimates of the signals from the different base stations but a significant source of error is the multipath signal components typical in for example cellular mobile communication systems. According to the invention, the effect of multipath is mitigated by selecting a subset of signals based on a time of arrival estimate of each of the signals. An averaged time of arrival estimate with improved accuracy is then determined from the selected subset. A typical use of the invention is for location determination in a cellular mobile communication system.

21 Claims, 3 Drawing Sheets

-PRIOR ART-

METHOD OF AND SYSTEM FOR ESTIMATING A TIME OF ARRIVAL OF A RADIO SIGNAL

FIELD OF THE INVENTION

This invention relates to a method of and system for estimating a time of arrival of a radio signal and in particular to location determination based on time of arrival estimates.

BACKGROUND OF THE INVENTION

A known method of location determination consists in determining a distance between an object and a number of fixed positions. For example, in a cellular radio communication system such as the Global System for Mobile communication (GSM), the location of a subscriber unit can be determined by estimating the range from the subscriber unit to a number of fixed basestations with known locations. If the location must be determined in three dimensions, the range between the subscriber unit and three base stations must be determined. This is known as triangulation.

It is known to determine the range between the base stations from the time of arrival of signals transmitted between the subscriber unit and the base station. For example, if a signal is transmitted by a base station to the subscriber unit, the time of arrival will depend on the propagation delay which is proportional to the distance travelled by the radio signal. If the time of transmission is known the relative time of arrival can be calculated and this will correspond to the range between the base station and the subscriber unit. Typically, the subscriber units are not synchronised with the base stations, and the location is determined from the difference in the time of arrival of signals from different base station. In this case signals from at least one additional base stations must be received by the subscriber unit. The same general principle applies when location determination is based on transmitting signals from the subscriber unit to the base stations.

In for example cellular communication systems such as GSM, radio propagation is characterised by typically being along several different paths as shown in FIG. 1. These different paths can include reflections caused by various objects and as a result the paths generally have different path lengths. In FIG. 1, a base station 101 transmits to a subscriber unit 103. In the example, the propagation is such that the transmitted signal reaches the subscriber unit 103 through a direct path 105 and through a longer path 107 which results from the transmitted signal reflecting of a building 109. As a consequence of the different path lengths the received radio signal will often consist of a number of signal components being delayed versions of the same signal. In the example of FIG. 1 the two path lengths will result in two versions of the same signal being received and thus result in a propagation channel as illustrated in FIG. 2 where the first received signal component 201 corresponds to the signal received along path 105 and the second received signal component 203 corresponds to the signal received along path 107.

Each of the paths 105,107 will comprise a number of slightly different paths with slightly different path lengths and the constructive or destructive interference between versions of the signal travelling along paths with slightly different path lengths will introduce fading on each of the received signal components 201,203. The number, amplitude and delays of the individual signal components depend on the exact propagation paths and will thus vary when the environment changes or the subscriber unit moves. The phenomenon is known as multipath propagation.

The existence of multipath propagation is a significant error source when performing location measurements based on time of arrival measurements. It is therefore desirable to develop a system which mitigates the effect of multipath propagation on time of arrival determination.

SUMMARY OF THE INVENTION

The invention seeks to provide a method of and system for estimating an average time of arrival of a radio signal which mitigates the error caused by noise, interference or multipath propagation.

According to a first aspect of the present invention, there is provided a method of estimating an average time of arrival of a radio signal comprising the steps of:

transmitting a plurality of radio signals from a transmitter to a receiver through a propagation channel; estimating a time of arrival for each of a plurality of the radio signals received at the receiver; selecting a subset of the plurality of the radio signals received at the receiver in response to the time of arrival estimates; generating an averaged propagation channel estimate from the subset of radio signals; and estimating an averaged time of arrival from the averaged propagation channel estimate.

Preferably the subset consists of the radio signals having an estimated time of arrival between a lower percentile and an upper percentile of the time of arrival estimates of the plurality of the radio signals received at the receiver or alternatively the subset consists of a number of the radio signals having the closest time of arrival estimate to the time of arrival corresponding to a percentile of the time of arrival estimates of the plurality of the radio signals received at the receiver.

According to a feature of the invention at least one of the percentiles or the number of the signals is varied in response to at least one parameter chosen from the group of: a variance of the time of arrival estimates; a signal to noise ratio of at least one of the plurality of signals; a previous averaged propagation channel estimate; a propagation channel estimate of at least one of the plurality of signals; an accuracy of the averaged time of arrival estimate; and available computational resource.

According to a different aspect of the invention, there is provided a system for estimating an average time of arrival of a radio signal comprising: a receiver; a transmitter transmitting a plurality of radio signals to the receiver through a radio propagation channel; processor means for estimating a time of arrival for each of a plurality of the radio signals received at the receiver; means for selecting a subset of the plurality of the radio signals received at the receiver in response to the time of arrival estimates; means for generating an averaged propagation channel estimate from the subset of radio signals; and means for estimating an averaged time of arrival from the averaged propagation channel estimate.

BRIEF DESCRIPTION OF THE DRAWINGS

An embodiment of the present invention is described below, by way of example only, with reference to the Drawings, in which.

DETAILED DESCRIPTION OF A PREFERRED EMBODIMENT

The following description of a specific embodiment of the invention is given in the context of a GSM cellular system where time of arrival estimates are used for the determination of the position of a subscriber unit. The embodiment assumes that the signals used for the position determination is transmitted from the base station to the subscriber unit (downlink direction) but the principle is the same if the signal is transmitted from the subscriber unit to the base stations (uplink direction).

Figure 1:
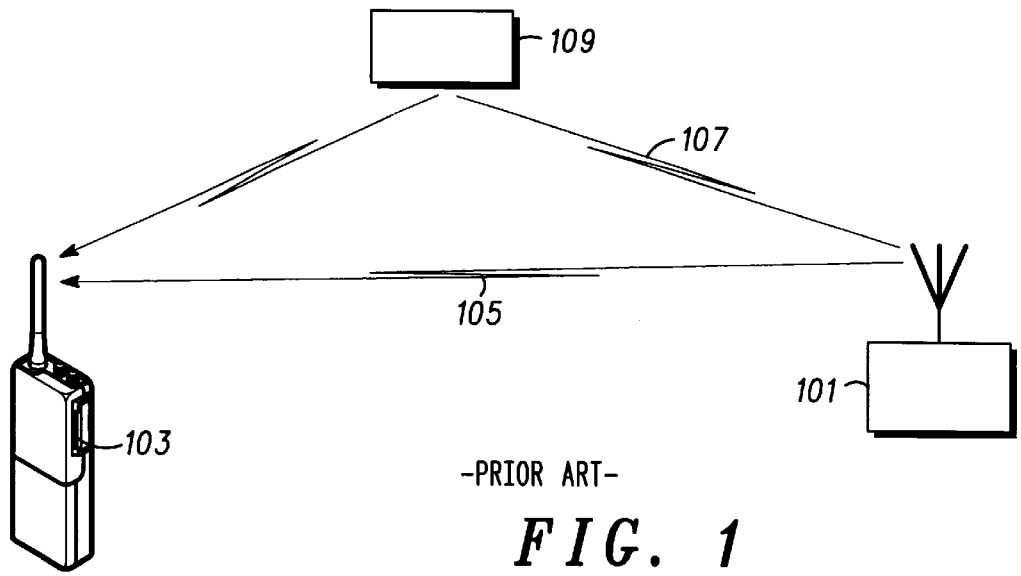
FIG. 1 illustrates the principle of multipath radio propagation.
Figure 2:
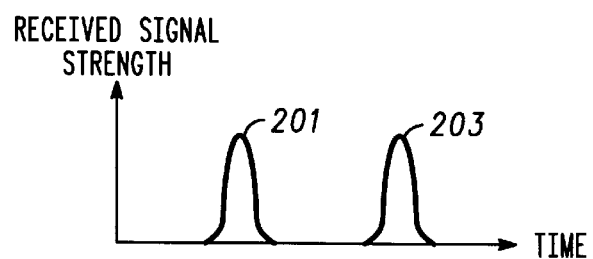
FIG. 2 is an illustration of a propagation channel estimate with multipath signal components.
Figure 3:
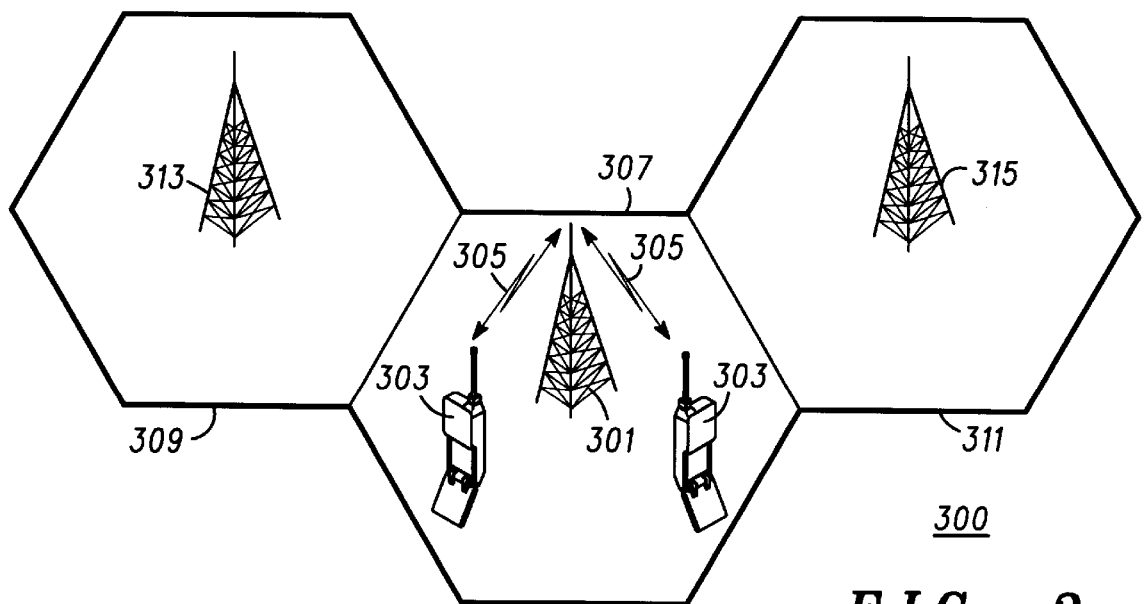
FIG. 3 illustrates a GSM cellular communication system in accordance with prior art.
Figure 4:
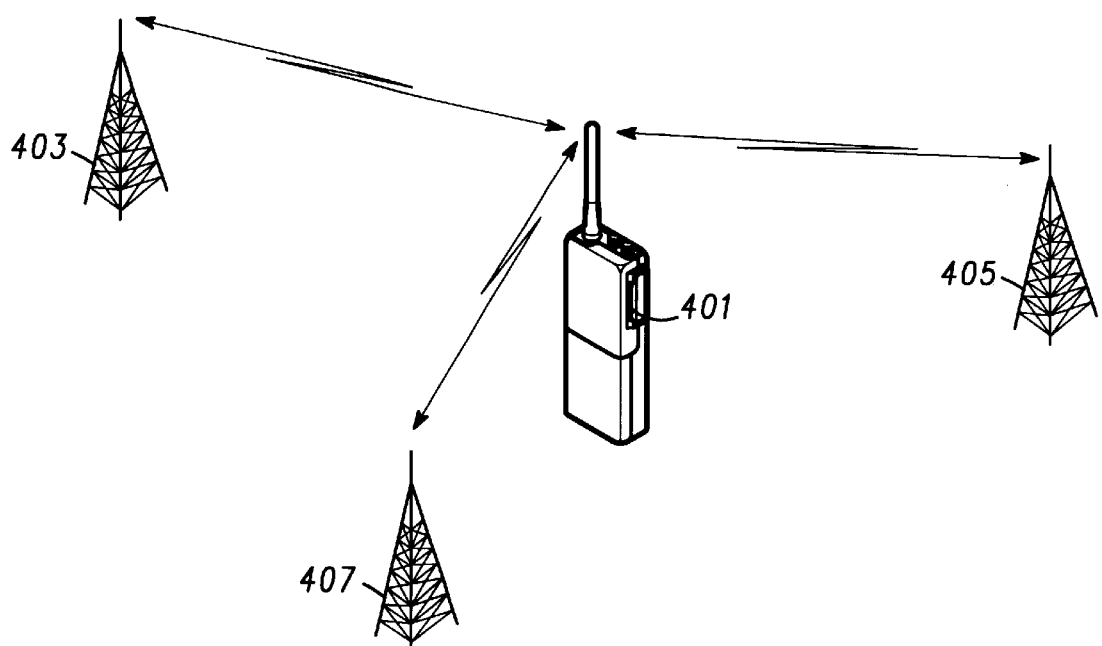
FIG. 4 illustrates location determination in a cellular communication system in accordance with prior art.

FIG. 3 illustrates a GSM cellular communication system 300. In the system, a base station 301 communicates with a number of mobile stations 303 over radio propagation channels 305. In the cellular system, the base station 301 covers users within a certain geographical area 307 whereas other geographical areas 309, 311 are covered by other base stations 313, 315. In GSM it is often possible for a subscriber unit to receive signals from other base stations than the one covering the cell in which the subscriber unit is located. FIG. 4 illustrates an example where a subscriber unit 401 receives signals from three base stations 403,405, 407. The signal to noise ratio of these signals may be insufficient for reliable communication but still be sufficient for reliable time of arrival estimation. If not enough base stations can be received in a given area extra transmitters with known locations can be introduced to the system.

By determining the range from the subscriber unit to the base stations, the position of the subscriber unit can be calculated. A method for determining the range is to determine the time of arrival of the signals from the different base stations. As subscriber unit and base stations typically are not synchronised a signal from an additional base station can be used to resolve the unknown timing offset. Further explanation of determination of a position from time of arrival estimates can be found in for example "Understanding GPS—Principles and Applications", Kaplan, Artech House Publishers 1996, ISBN 0-89006-793-7.

Multipath propagation has been widely identified as the main source of error in time of arrival estimation in a radio environment. In radio systems, the propagation channel is essentially characterised by the delays and amplitudes of the individual signal components. Typically, the propagation channel will comprise many different paths which furthermore change due to changes in the subscriber units exact position or changes in the environment. As a consequence it is often impossible to resolve the individual signal components.

For time of arrival estimation, the first signal component corresponds to the path length closest to the direct line of sight path and hence if this cannot be resolved the position determination will be significantly degraded.

Figure 5:
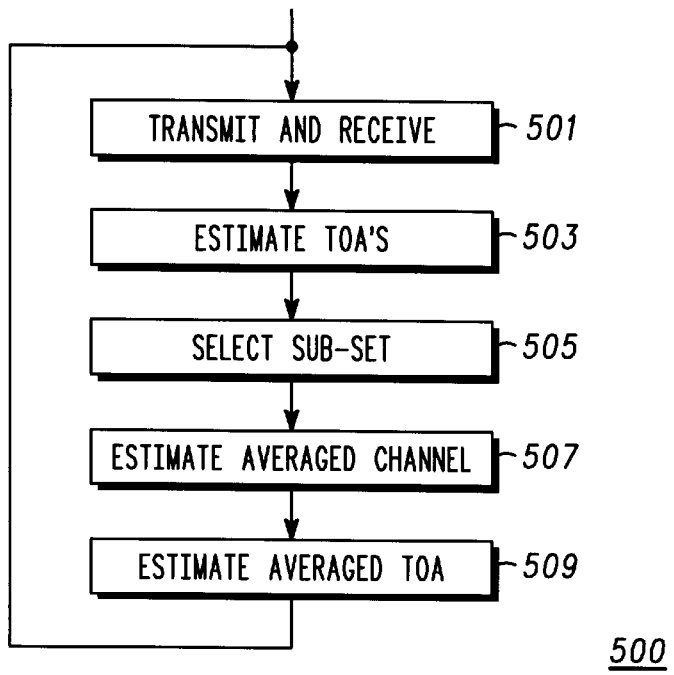
FIG. 5 is a flow chart of an embodiment of a method for estimating an average time of arrival in accordance with the present invention.

FIG. 5 shows a flowchart 500 of an embodiment of the current invention.

In step 501, a plurality of signals is transmitted from a base station and received by the subscriber unit. The received signal will typically experience multipath propagation through the propagation channel and comprise a plurality of signal components. In the described embodiment the plurality of signals will consist in a plurality of time separate GSM data bursts. In other embodiments the plurality of signals can for example include a number of signals transmitted simultaneously but on separate frequencies or using different spreading codes in a Code Division Multiple Access (CDMA) system.

In step 503, a time of arrival estimate is generated for each of the received signals. For a non-moving subscriber unit the distance between the subscriber unit and the base station is unchanged and the line of sight path length is the same. Due to the changes in the environment and the multipath propagation channel however the relative time of arrival (i.e. the absolute time of arrival minus the time of transmission) will vary from one signal to the next.

Figure 6:
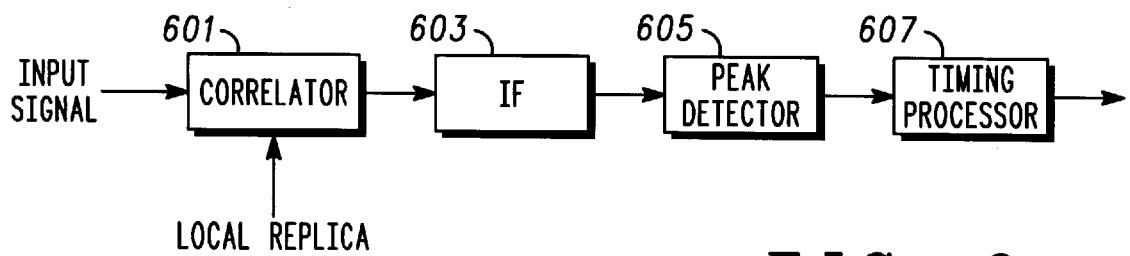
FIG. 6 illustrates an embodiment of a time of arrival estimator.

FIG. 6 illustrates an embodiment of a time of arrival estimator. The received signal is downconverted to base band as is well known in the art and the base band signal is fed to a correlator 601. The correlator 601 correlates the received base band signal to a local replica for different timing offsets. By squaring the output of the correlator in a squarer 603, a waveform corresponding to an estimate of the propagation channel estimate is obtained. The approach is similar to propagation channel estimation commonly employed in GSM receivers. Under ideal conditions (no noise, no multipath), the position of the peak of that waveform gives the time of arrival. In the presence of noise and multipath propagation, it is often not possible to separate the signal components from the individual paths. In this case the propagation channel estimate will spread over a time interval and the time of arrival is taken as the time of the peak of that propagation channel estimate. The time of arrival estimator thus includes a peak detector 605 and a timing processor 607 which determines the time of the peak.

In Step 505, a subset of the signals are selected in response to the time of arrival estimates generated in step 503. By carefully selecting the signals to process further the error caused by multipath can be substantially reduced.

Figure 7A:
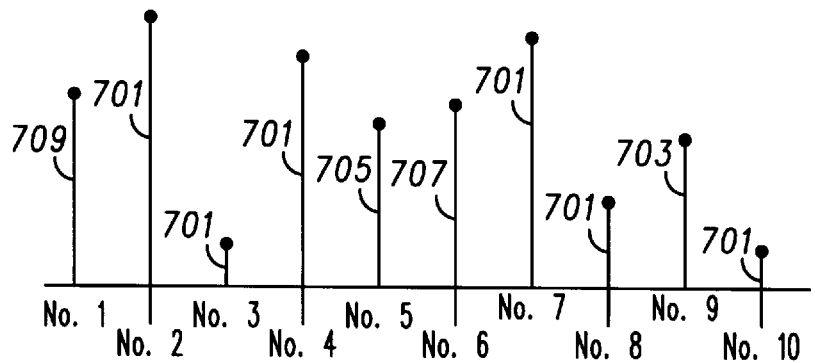
FIG. 7 shows an example of selection of a subset of signals in accordance with the present invention.
Figure 7B:
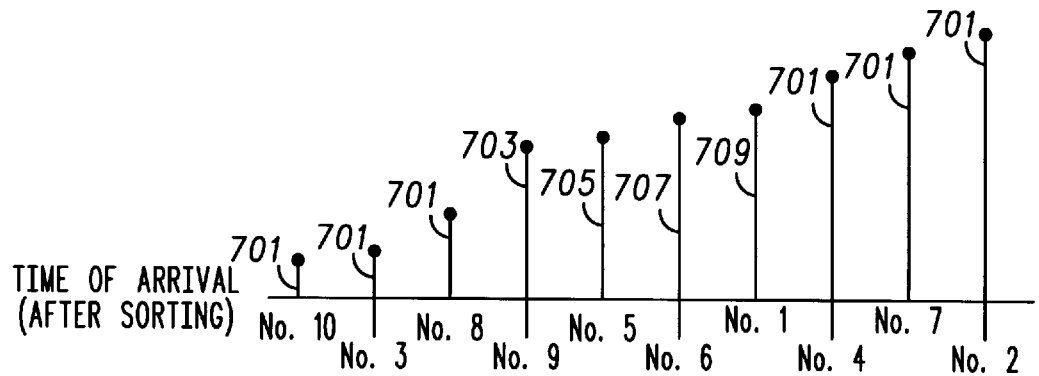

According to one embodiment, the time of arrival estimates are arranged in ascending order as shown in FIG. 7, where FIG. 7a illustrates the time of arrival estimates for 10 received signals 701,703,705,707,709 and FIG. 7b shows these signals 701,703,705,707,709 arranged in ascending order. The subset of signals are then selected as a number N of signals which are closest to a given threshold. In the example a subset of four signals are selected as the four signals which have time of arrival estimates closest to a given percentile, in this case the 50% percentile. Consequently, in the example given, the four signals 703, 705,707 and 709 are selected for the subset.

In an alternative embodiment, the subset is chosen as the signals having time of arrival estimates between a lower percentile and a higher percentile, for example as being the signals having time of arrival estimates between the 20% percentile and the 60% percentile. A bias towards the shorter time of arrival estimates can be beneficial as these will be more likely to result from shorter propagation paths having lengths closer to the line of sight distance between base station and subscriber unit.

The selection of the subset will in the described embodiment thus be a function of the number N of signals in the subset and the value of the threshold percentiles. Both of these parameters can be predefined or can be varied adaptively in response to other parameters such as for example:

A variance of the time of arrival estimates:

A large variance of the time of arrival estimates indicate that the estimates are not very reliable and the number of signals in the subset can be included. The percentiles can likewise be modified for example by increasing the gap between the lower and higher percentile to allow more estimates to be included in the subset. In other situations it may be beneficial to reduce the gap or to move the percentiles towards higher or lower values.

A signal to noise ratio of at least one of the plurality of signals:

As for increased variance of the time of arrival estimates a lower signal to noise ratio can be indicative of more unreliable estimates and the selection parameters can be changed accordingly.

A previous averaged propagation channel estimate:

The selection parameters may be changed in response to an averaged propagation channel estimate generated earlier. For example if the propagation channel estimate have virtually no multipath signal components it may be acceptable to assume that the current propagation channel does not have significant multipath components and thus the percentiles or the number of signals in the subset can be modified to reflect that reduced multipath rejection is required.

A propagation channel estimate of at least one of the plurality of signals:

As well as modifying the selection parameters in response to a previous averaged propagation channel estimate the parameters can be modified in response to a propagation channel estimate of one of the plurality of signals received by the subscriber unit.

An accuracy of the averaged time of arrival estimate

Generally the more signals included in the subset the more reliable the average time of arrival estimate will be. According to one embodiment of the invention the selection parameters are therefore chosen in response how accurate the averaged time of arrival estimate is required to be.

Available computational resource

The more signals which are included in the subset the higher is the computational resource required for generating the averaged time of arrival estimate. Consequently the number of signals in the set or the range between the lower and higher percentile can be increased when more computational resource is available and reduced when this resource is required for other tasks.

In step 507 an averaged estimate of the propagation channel is generated from the subset of radio signals selected in step 505. This is typically done by simply averaging the propagation channel estimates for each of the signals of the subset. A more elaborate averaging where a weighting of the individual propagation channel estimates can be adopted and specifically the weighting of each estimate can be in response to one of the following parameters:

A signal to noise ratio of the signals:

Generally the propagation estimate will tend to be more accurate for higher signal to noise ratios where noise is less significant. The averaging can therefore apply a weighting where the propagation channel estimates are weighted higher for signals having a good signal to noise ration than for signals having a low signal to noise ratio.

An estimated propagation channel impulse response energy; and

Likewise, the propagation estimate will tend to be more accurate for received signal levels and the averaging can therefore apply a weighting where the propagation channel estimates are weighted higher for signals having a high impulse response energy.

The multipath propagation characteristics for the signals.

Multipath propagation has a significantly degrading effect on time of arrival estimates. Preferably, the averaging will therefore apply a weighting where the signals having propagation channel estimates with few multipath components are weighted more than signals with high levels of multipath propagation. The level of multipath can be determined from an algorithm based on evaluating how many signal components are received. A simpler approach is to determine the level of multipath based on the duration of the propagation channel impulse response where a longer impulse response indicate a higher level of multipath propagation.

In step 509, an average time of arrival is estimated from the averaged propagation channel estimate using the same techniques as for calculating the time of arrival estimate for each of the received signals. In the current embodiment where time separate signals are used the time of arrival estimate will be a relative time of arrival estimate (i.e. relative to time of transmission) whereas the time of arrival for simultaneous signals using different frequencies or spreading codes can be an absolute or relative time of arrival estimate.

The individual steps in FIG. 5 are shown sequentially but it will be apparent that many of the operations can be performed in a different order or in parallel. Preferably, the method is implemented as a software program running on a suitable processor such as a microprocessor, a digital signal processor or a micro-controller. The method can be implemented in the subscriber unit, in the base station or can be distributed in the system.

Research has shown that the described process efficiently mitigates errors caused by multipath. Furthermore, it can have a mitigating effect on errors caused by noise or interference. However, it can in some situations have a degrading effect in a noise or interference dominated propagation environment. For example if the lower and higher percentile is chosen asymmetrically (such as the lower being the 10% percentile and the higher being the 60% percentile), an unwanted bias is introduced.

In one embodiment, the process will thus include a pre-processing step where the dominant source of error is determined and the selection of the subset of signals also takes this parameter into account. The parameters for the selection are in this embodiment changed dependant on whether multipath or noise/interference is the major factor. If multipath is the major source of error an asymmetric choice of percentiles will be adopted but if noise or interference is the major source of error symmetric percentiles are chosen. In one embodiment, the process can be used only when multipath is the dominant source of error.

The dominant source of error can be determined from an estimation of the signal to noise ratio and the multipath present in the propagation channel estimates as will be apparent to a person skilled on the art.

The setting of the parameters for selection of the subset can be performed dynamically based on estimation of the current propagation parameters. However, according to a different embodiment, the selection parameters are at least initially based on pre-defined knowledge of the environment. Specifically, the parameters can be in response to knowledge of the propagation environment such as whether noise or multipath is the dominant source of error or how much multipath is likely to be present.

Based on time of arrival measurements the range i.e. distance between the subscriber unit and the base station can be determined. By determining the distance to two or more other base stations, using the described technique or other techniques, the location of the subscriber unit can be determined by triangulation.

In some situations it will be possible to receive signals from more base stations than the minimum required for performing a position determination. In this case the individual range estimates can be weighted in the location determination in response to the distribution of the time of arrival estimates. For example ranges obtained from propagation paths resulting in very little variation in the time of arrival estimates for different signals may be weighted more than ranges obtained from measurements having a large variation in the time of arrival estimates for different signals. The weighting of the range estimates can thus be in response to the variance of the time of arrival estimates.

What we claim is:

1. A method for estimating an average dine of arrival of a radio signal in a receiver, comprising:

receiving a plurality of radio signals at the receiver;

estimating a time of arrival for each of the plurality of radio signals received at the receiver;

selecting a subset of the plurality of the radio signals received at the receiver based on the time of arrival estimates;

generating an averaged propagation channel estimate from the subset of radio signals; and estimating art averaged time of arrival from the averaged propagation channel estimate.

2. The method of claim 1, selecting the subset by selecting radio signals having an estimated time of arrival between a lower percentile and an upper percentile of the time of arrival estimates of the plurality of the radio signals received at the receiver.

3. The method of claim 2, varying at least one of the percentiles in response to at least one parameter of a group comprising: a variance of the time of arrival estimates; a signal to noise ratio of at least one of the plurality of signals; a previous averaged propagation channel estimate; a propagation channel estimate of at least one of the plurality of signals; an accuracy of the averaged time of arrival estimate; and available computational resource.

4. The method of claim 1, selecting the subset by selecting radio signals having time of arrival estimates closest to a time of arrival corresponding to a percentile of the time of arrival estimates of the plurality of the radio signals received at the receiver.

5. The method of claim 4, varying the number of the radio signals in the subset in response to a parameter of a group comprising: a variance of the time of arrival estimates; a signal to noise ratio of at least one of the plurality of signals; a previous averaged propagation channel estimate; a propagation channel estimate of at least one of the plurality of signals; an accuracy of the averaged time of arrival estimate, and available computational resource.

6. The method of claim 5, generating an averaged propagation channel estimate from the subset of radio signals by weighting each of the radio signals of the subset based on a parameter chosen from a group comprising: a signal to noise ratio of the signals; an estimated propagation channel impulse response energy; and multipath propagation characteristics for the radio signals.

7. The method of claim 1, generating a propagation channel estimate for each signal of the subset, and generating the averaged propagation channel estimate from the subset of radio signals by averaging the propagation channel estimates.

8. The method of claim 1, estimating a range between the receiver and a radio signal transmitter by estimating the average time of arrival.

9. The method of claim 8, estimating a plurality of ranges between the receiver and a corresponding plurality of radio signal transmitters, weighting each range estimate based on a distribution of time of arrival estimates of the plurality of signals.

10. The method of claim 1, determining a dominant source of error, selecting the subset of the plurality of the radio signals received at the receiver based on the dominant source of error.

11. A method in a mobile wireless communication device, comprising:

receiving a plurality of radio signals at the mobile wireless communication device;

estimating a time of arrival for each of the plurality of radio signals received at the mobile wireless communication device;

selecting a subset of the plurality of the radio signals received at the mobile wireless communication device based on the time of arrival estimates;

generating an averaged propagation channel estimate from the subset of radio signals; and estimating an averaged time of arrival from the averaged propagation channel estimate.

12. The method of claim 11, selecting the subset by selecting radio signals having an estimated time of arrival between lower and upper percentiles of the time of arrival estimates.

13. The method of claim 11, selecting the subset by selecting radio signals having time of arrival estimates closest to a percentile of the time of arrival estimates.

14. The method of claim 11, generating a propagation channel estimate for each signal of the subset, generating the averaged propagation channel estimate from the subset of radio signals by averaging the propagation channel estimates.

15. The method of claim 11, estimating a range between the mobile wireless communication device and a radio signal transmitter by estimating the average time of arrival.

16. The method of claim 11, estimating a plurality of ranges between the mobile wireless communication device and a corresponding plurality of radio signal transmitters, weighting each range estimate in response a distribution of time of arrival estimates of the plurality of signals.

17. The method of claim 11, determining a dominant source of error, selecting the subset of the plurality of the radio signals received at the mobile wireless communication device in response to the dominant source of error.

18. A mobile wireless communication device, comprising:

a receiver;

processor coupled to the receiver, the processor having means for means for estimating a time of arrival for each of a plurality of the radio signals received by the receiver, the processor having means for selecting a subset of the plurality of the radio signals received by the receiver in response to the time of arrival estimates, the processor having means for generating an averaged propagation channel estimate from the subset of radio signals, and the processor having means for estimating an averaged time of arrival from the averaged propagation channel estimate.

19. The mobile wireless communication device of claim 18, the processor having means for estimating a range between the mobile wireless communication device and a radio signal transmitter by estimating the average time of arrival.

20. A method in a wireless communications device, comprising:

estimating a time of arrival for each of a plurality of radio signals received at the mobile wireless communication device;

selecting a subset of the plurality of the radio signals received at the mobile wireless communication device based on the time of arrival estimates;

generating an averaged propagation channel estimate from the subset of radio signals selected.

21. The method of claim 20, estimating an averaged time of arrival from the averaged propagation channel estimate.

* * * * *